A. W. T. BEYER.
COMBINED TYPE WRITING AND COMPUTING MACHINE.
APPLICATION FILED NOV. 14, 1911.
1,238,060.
Patented Aug. 21, 1917.
2 SHEETS—SHEET 1.
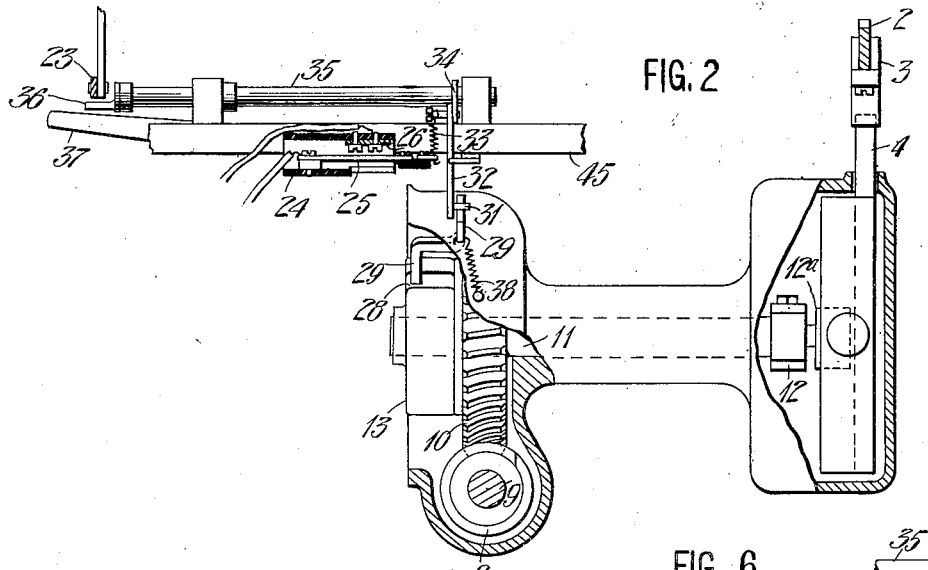
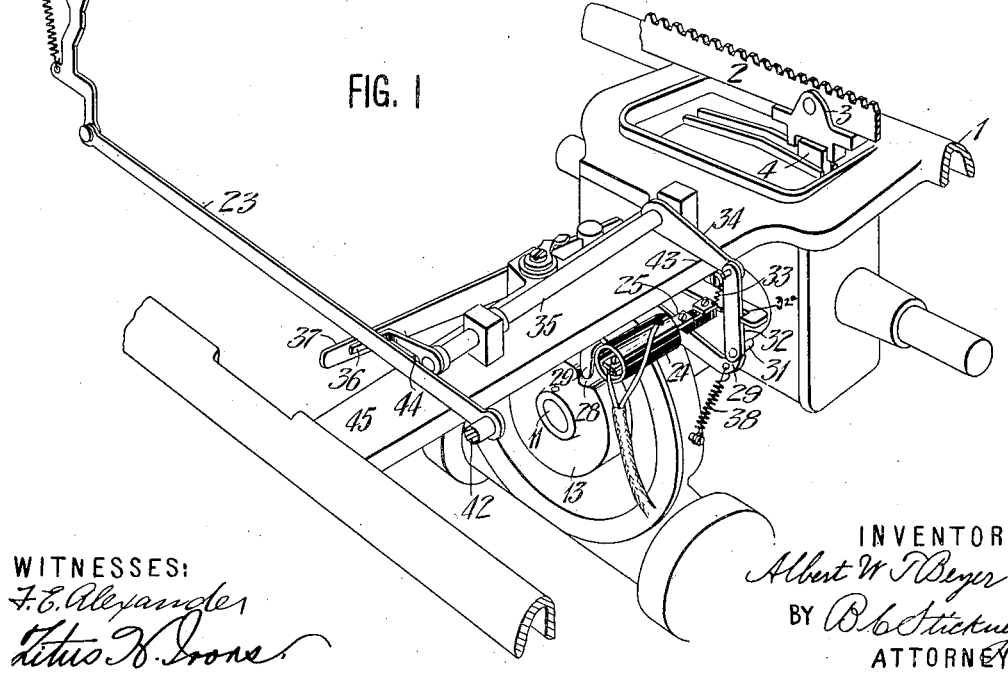
WITNESSES:
F. E. Alexander
Titus N. Irons
INVENTOR:
Albert W. T. Beyer
BY B. C. Stickney
ATTORNEY.

A. W. T. BEYER.
COMBINED TYPE WRITING AND COMPUTING MACHINE.
APPLICATION FILED NOV. 14, 1911.

1,238,060.

Patented Aug. 21, 1917.
2 SHEETS—SHEET 2.

WITNESSES:
F. E. Alexander
Titus N. Irons

INVENTOR:
Albert W. T. Beyer
BY B. C. Stickney
ATTORNEY.

UNITED STATES PATENT OFFICE.

ALBERT W. T. BEYER, OF HARTFORD, CONNECTICUT, ASSIGNOR, BY MESNE ASSIGN-MENTS, TO UNDERWOOD COMPUTING MACHINE COMPANY, OF NEW YORK, N. Y., A CORPORATION OF NEW YORK.

COMBINED TYPE-WRITING AND COMPUTING MACHINE.

1,238,060.   Specification of Letters Patent.   Patented Aug. 21, 1917.

Application filed November 14, 1911. Serial No. 660,203.

*To all whom it may concern:*

Be it known that I, ALBERT W. T. BEYER, a citizen of the United States, residing in Hartford, in the county of Hartford and State of Connecticut, have invented certain new and useful Improvements in Combined Type-Writing and Computing Machines, of which the following is a specification.

My invention relates to intermittent drive mechanism especially adapted to be used in combined typewriting and computing machines.

It is herein illustrated as applied to a computing machine of the Underwood-Hanson type in which numbers are temporarily recorded as written and a general operator is reciprocated after writing a given number in order to carry the number so recorded into the totalizer; and it is illustrated more particularly as an improvement on application No. 595,451, filed December 9, 1910. In said application is disclosed a general operator which is reciprocated by means of a motor which is continuously driven, and which is provided with a clutch that automatically disconnects the motor after each full movement of the general operator.

My invention provides improved, reliable and inexpensive means for disconnecting the power circuit of the electric motor at the same time the clutch is disconnected.

In the machine illustrated in said application, a worm is driven by an electric motor and engages a worm wheel. This worm wheel is attached to the driving member of a clutch, of which the driven member turns a shaft to which is connected a slide that reciprocates the general operator. This clutch comprises a hub fixed to the worm wheel, a cup keyed to the shaft, and an intermediate collar carrying a stop projecting through an opening in the cup. This stop is normally intercepted by a latch, and when not so intercepted, the collar is thrown forward by a spring, so as to cause the cup and hub to lock. The interposition of the latch in the path of the stop automatically releases the clutch when the stop strikes the latch, and arrests the cup, the shaft, and the slide.

One object of this invention is to have the electric connections outside the clutch, and yet to be controlled by the revolution of the clutch or movement of the general operator. For this purpose I may provide a cam on the outer surface of said cup on which rides an arm controlling an electric switch in the motor circuit. This cam surface may be arranged to hold said switch closed during one rotation of the cup-shaped member, and therefore, one reciprocation of the general operator, but when the stop strikes the latch and opens the clutch to disconnect the motor, a depression in said cam may simultaneously cause the circuit to be broken, thereby cutting off the power from the motor.

A key lever on the computing machine may be arranged to lift the latch and to positively close the motor circuit when it is desired to start the general operator, and the parts are preferably so arranged that the circuit is closed slightly before the latch is removed from the stop. The clutch is so arranged, that the starting of the motor tends to lock the parts, irrespective of the action of the spring in the clutch.

Other features and advantages will hereinafter appear.

In the accompanying drawings,

Figure 1 represents a perspective view of my invention, and only so much of the parts of a machine of the Underwood-Hanson type and the table supporting it, as is necessary to understand the relation of the parts.

Fig. 2 is a side view of the same, partly in section.

Fig. 6 is a view largely diagrammatic, of the connections between the current control and the motor.

Figure 3:
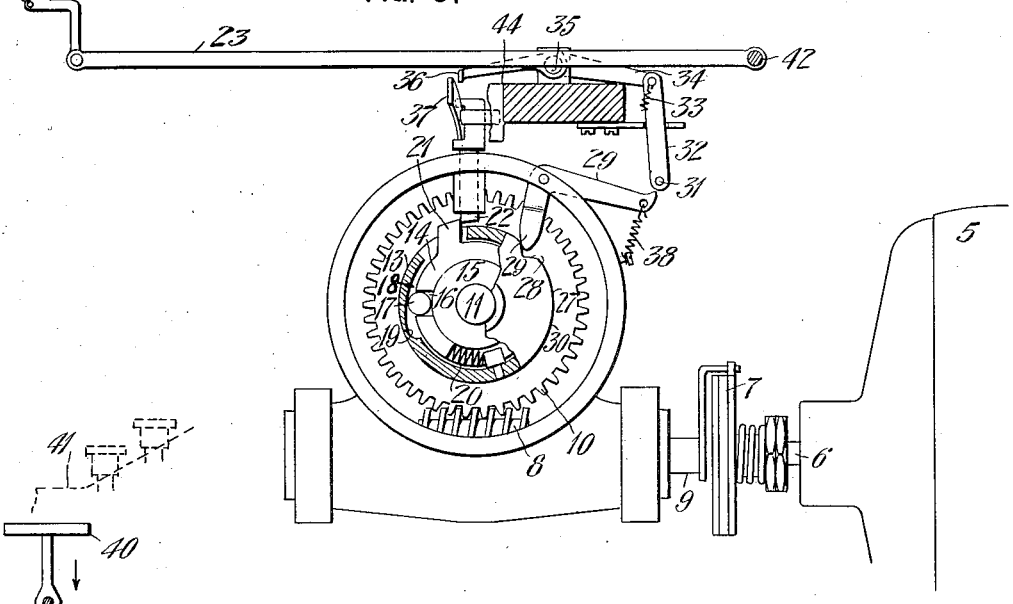
Figs. 3 and 4 are cross section views.
Figure 4:
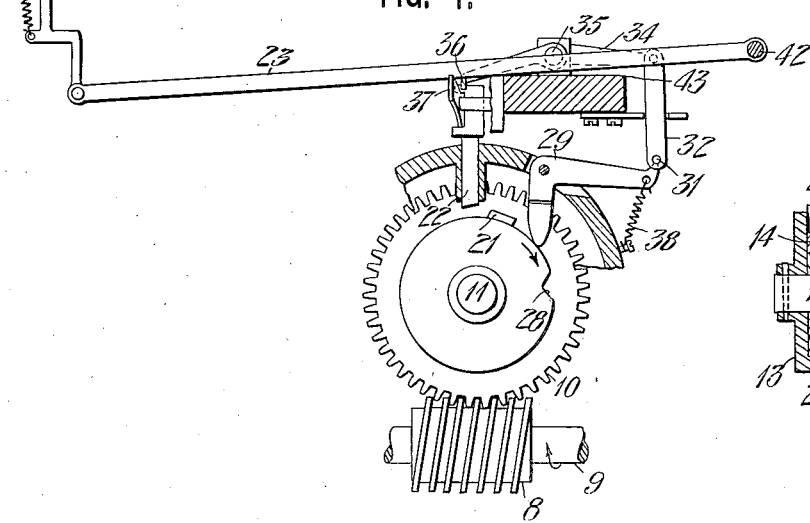
Figure 5:
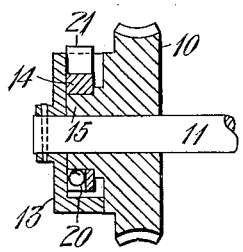
Fig. 5 is a section through the clutch.

In the drawings, 1 is part of a table supporting a computing machine, of which 2 is a general operator carrying a yoke 3 which is engaged by a reciprocating slide 4 driven from a motor 5 by connections hereinafter described.

On the shaft 6 of the motor, is a safety clutch 7 arranged to prevent the parts from being broken by allowing the members of the clutch to slip on each other in case of overload. A worm 8 is formed on a shaft 9 driven by this clutch, and engages with a worm wheel 10 which revolves loosely on a shaft 11 which shaft drives the slide 4 by means of a fixed arm 12 carrying a slide 12ª working in said slide 4.

On the shaft 11 is pinned a cup-shaped member 13, within which rides a collar 14 loose on an extension 15 of the hub of the worm wheel 10. In this collar is formed a pocket 16 carrying a roll 17, which may either jam against said cup-shaped member at 18, or ride loosely in a pocket 19 in said member. The collar 14 is pressed by a spring 20 normally tending to force said roll to lock the hub 15 of the worm wheel 10 against the cup-shaped member, and thus compel them to revolve together. On said collar 14 is formed a stop 21 which is arranged to project through an opening in the cup member into the path of a stop or latch 22 controlled by a lever 23.

When the motor rotates, it tends to turn said collar 14 to swing said stop 21 against said latch 22, and if said latch allowed it to turn, the collar would make the parts lock. On releasing the latch, the collar 14 moves around slightly under the combined influence of the spring and the revolving hub, and locks the parts together as above stated, so that they drive the general operator.

The circuit driving the motor is led through a switch comprising a spring 25 which normally springs away from the terminal 26, thus breaking the circuit. When the lever 23 is depressed to remove the latch 22 out of the path of the stop 21, it depresses an arm 36 underlying said lever and fast on a rock shaft 35, which rock shaft also carries a rock arm 34, and said last-named rock arm, by means of a spring 33, draws the spring terminal 25 upward into contact with the terminal 26, thus closing the circuit, as seen in Fig. 6, through the motor 5. This starts the motor.

The circuit is kept closed when the motor is started by means of a cam finger 29, which rides on the outer surface 27 of the cup member during the rotation of the motor. Said cam finger 29 is pivotally mounted on the frame of the machine, and has an elbow arm underlying a tappet 31 on a bar 32 guided in a slotted arm 32ª, said bar depending from the rock arm 34 that closes the circuit through the terminals 25 and 26. Thus during the rotation of the cup member 13, the cam surface 27 holds the driving circuit positively closed, and at the end of one rotation of the motor, a depression 28 in said cam member allows the cam finger 29 to fall and be drawn, by means of a spring 38, downward so that the spring 33 can draw the rock arm 34 downward and break the circuit at the terminals 25 and 26. The terminal 26, as will be seen in Fig. 6, is fast on an insulated bar 24 on the frame of the machine, while the terminal 25 is formed as a spring member mounted on said insulated bar 24. Preferably rock arm 36 is so arranged, that it is struck by said lever 23 slightly before lever 37 controlling the latch, is struck, so that the motor is started, and will tend to lock the clutch as soon as the latch is removed from the path of the stop. The cam finger or lever 29 is normally drawn down so it tends to enter into the depression 28 by the spring 38, and the arm 32 is connected by the spring 33 to the switch spring 25, in order to allow for any difference in throw of the parts, and to insure close contact in the switch.

A key 40 on lever 23 at a convenient point near the keyboard 41 of the typewriter, may be struck to depress the lever 23 around its pivot 42 which is fixed to a side of the frame of the machine (not shown), and thus the general operator may be easily operated. Edges 43 and 44 of the cross bar 45 of the table frame serve as stops to limit the motion of the rock arms 34 and 36 and prevent overthrow.

In the use of my invention, after the numerals have been written on the typewriter and the pins set up in the computing mechanism as described in said aforesaid application, to be engaged by the general operator, the key 40 is depressed to carry the totals into the dials. This key, in the manner above described, depresses arm 36 to close the electric circuit, and arm 37 to raise the latch and lock the clutch, the motor meanwhile starts the worm wheel, grips the shaft 11, through the clutch, and turns the parts. The key may now be released and the cam surface 27 maintains the circuit closed until the clutch has completed substantially one revolution when the stop 21 strikes the latch 22, and the finger 29 falls into the depression 28 of the cam. The circuit is thereby broken and the shaft which drives the general operator is stopped.

Momentum may continue to cause the motor to revolve, but owing to the clutch being disconnected, it will not move any parts of the machine, and thus no harm can be done.

It will be noted that the slide 4 constantly engages the yoke 3 of the general operator 2, and said slide is driven by the cup 13 on the shaft 11 both backward and forward. This cup is held against rotation by the stop 22 that extends into the path of the stop 21 which projects through it. The stop 22 therefore normally locks the general operator in its normal backward position through the shaft 11 and slide 4. Thus the cup 13 in making one cycle or revolution drives the general operator through one cycle, and then locks it by the stop 22.

Variations may be resorted to within the scope of the invention, and portions of the improvements may be used without others.

Having thus described my invention, I claim:

1. The combination, with a rotary part to be intermittently driven; of a motor; a clutch between said rotary part and said motor arranged to engage the former to couple it to the motor, and to automatically release it after a given cycle; a motor circuit; a normally-open switch therein; means to cause said clutch to engage said rotary part; independent means for closing said switch; and means acting automatically, consequent upon the engagement of said clutch, to maintain said switch closed until said clutch is released, when the switch is released.

2. The combination, with a part to be intermittently driven; of a motor; a clutch between said motor and said driven part; means for automatically releasing said clutch when said driven part completes a cycle of movement; and independent means acting automatically to disconnect power from said motor when said driven part completes such cycle.

3. The combination with a part to be intermittently driven, of a motor, a clutch between said motor and said driven part, a latch holding said clutch released and said driven part idle, an electric circuit for driving said motor, a switch clear of said clutch for controlling said circuit, and a common operating means for said latch and said switch.

4. The combination with a part to be intermittently driven, of a driving part, a motor to actuate said driving part, a clutch between said driving part and said driven part, said clutch including a gripping member arranged to grip when moved in the direction of rotation of the parts and relatively to one of them, a latch to arrest and release said gripping member, means controlling the supply of power to said motor, and means moving said latch and said power control to start said motor and cause said member to grip.

5. The combination with a part to be intermittently driven, of a motor, a clutch between said motor and said driven part, a stop for arresting said driven part and releasing said clutch when said intermittently driven part has completed one cycle of movement, an electric circuit driving said motor, independent means for making said circuit and removing said stop, and a key for operating both of said means.

6. The combination with a part to be intermittently driven, of a motor, a clutch between said motor and said driven part comprising a collar and a gripping member carried by said collar and arranged to grip when advanced in rotation and to release when retarded, a spring tending to advance said collar, a latch to arrest said collar and said driven part, means for operating said latch, and independent means for controlling the supply of power to said motor.

7. The combination with a part to be intermittently driven, of a motor, a clutch between said motor and said driven part, a latch controlling said clutch and said driven part, an electric circuit driving said motor, means for closing said circuit, means on said clutch for holding closed and for breaking said circuit to operate and stop said intermittently operated part, means for removing said latch, and means for closing said circuit almost simultaneously with the removal of said latch.

8. The combination with a part to be intermittently driven through a cycle of movement, of a motor, a clutch between said motor and said driven part, a latch arranged to arrest said clutch, a circuit driving said motor, a cam on said clutch, a switch to close said circuit, a lever for releasing said latch and closing said switch to start said driven part, and an arm associated with said switch and bearing against said cam, said arm being arranged to open said switch when said latch arrests said driven part, but to maintain said switch closed during the remainder of the cycle of movement of said driven part.

9. The combination with a part to be intermittently driven through a cycle of movement, of a motor, a clutch between said motor and said driven part, a latch controlling said clutch, a circuit driving said motor, a normally-open switch in said circuit, a lever for closing said switch to start said motor, an arm moved by said clutch to hold said switch closed during the cycle of movement of the driven part, and means for operating said lever and said latch arranged to act upon the former slightly in advance of the latter to cause said clutch to positively grip.

10. The combination with a part to be intermittently driven, of a motor, a clutch between said motor and said driven part, a latch controlling said clutch, a circuit driving said motor, a normally-open switch in said circuit, a lever for closing said switch to start said motor, an arm moved by said clutch to hold said switch closed during the revolution of the driven part, and means for operating said latch and said lever.

11. The combination with a motor, of an electric control therefor, comprising a normally-open switch, a wheel turned by said motor, a two-armed element, one arm of which bears against said wheel, a tappet engaged by the other arm of said element, a rock arm, a spring joining said rock arm to said switch to close the latter when the former is actuated, a rock shaft carrying said rock arm, means for rocking said shaft to close said switch, and a bar depending from said rock arm and carrying said tappet, whereby, during the engagement of the tappet and the second-named arm of the two-armed element, said switch will be held in closed position, said wheel having a depression therein into which the first-named arm of said element is arranged to fall, to terminate such engagement and permit said switch to open.

12. The combination with a part to be intermittently driven through a cycle of movement, of a motor, an electric circuit for driving said motor, a switch normally holding said circuit open, a clutch between said motor and said intermittently driven part, a key for closing said switch to start said motor, a pin normally holding the driven part of the clutch against movement, and a lever on said key to first close said circuit and then remove said pin to cause said motor to drive said intermittently driven part.

13. The combination, with a part to be intermittently driven; of a motor; a motor circuit; a key; a lever moved thereby; a pivoted bell crank rocked by said lever during the movement of the latter in one direction, and arranged, when so rocked, to close said circuit; a positive latch normally obstructing the movement of said part; and an arm shifted by said lever during its aforesaid movement in said direction to release the latch.

14. The combination, with a part to be intermittently driven through a definite cycle of movement; of a motor; a motor circuit; a key; a lever moved thereby; an arm rocked by said lever during the movement of the latter in one direction, and arranged, when so rocked, to close said circuit; a latch normally holding said part against motion; and a second arm shifted by said lever during its aforesaid movement in said direction to release the latch, said latch being arranged to automatically terminate the motion of said part on the completion of its said cycle of movement.

15. The combination with a part to be driven, of a motor for driving said part, a key for starting said motor, a normally-open circuit for driving said motor but closed by the operation of said key, a normally-released clutch between said motor and said driven part, said clutch having means forming part thereof for controlling the breaking of said circuit at the end of a cycle of movement of said driven part, and also having means forming part thereof for releasing said clutch at the end of a revolution, and separate devices operated by said key for thus controlling said circuit and causing said clutch to seize.

16. The combination with a part to be driven, of a motor for driving said part, a key, a normally-open motor circuit, a contact operable by said key for closing said circuit, a clutch between said motor and said driven part for permitting said motor to run idly, a casing for said clutch, a device under the control of said key for causing said clutch to seize, and means extending through said casing and coöperating with said clutch to hold said contact closed during one cycle of movement of said driven part and then to release it and thereby break said circuit, said contact lying outside of the clutch.

17. The combination with a part to be driven, and a motor for driving it, of a normally-open circuit for said motor, contacts for controlling said circuit, a key for closing said circuit through said contacts to start said motor, means for holding said circuit closed after the motor has started, a clutch between said motor and said driven part whereby the motor may run idly, said contacts being located outside of said clutch, means for causing said clutch to seize after said circuit is closed, and means within said clutch for releasing said clutch and automatically breaking said circuit after one cycle of movement of said driven part.

18. The combination with a part to be driven, of a motor for driving said part, a normally-open circuit for driving said motor, contacts for controlling said circuit, a key for closing said circuit through said contacts, a clutch between said motor and said driven part, means operated by said key for causing said clutch to seize after said circuit is closed, a casing for said clutch, said contacts being located outside of said casing, a device within said casing to hold said circuit closed during one cycle of movement of said driven part, and means extending through said casing for controlling said contacts from said holding device.

19. The combination with a part to be intermittently driven, of a motor for so driving it, a clutch between said motor and said driven part, a circuit outside of said clutch to drive said motor, a stop normally holding said clutch released and locking said driven part, and a key for releasing said stop, to cause said clutch to seize, and for closing said circuit.

20. The combination with a part to be intermittently driven, of a motor for so driving it, a clutch between said motor and said driven part, a circuit outside of said clutch to drive said motor, a stop normally holding said clutch released and locking said driven part, a key for releasing said stop, to cause said clutch to seize, and for closing said circuit, and means comprising a member extending beyond said clutch, to hold said circuit closed while said driven part completes one cycle of movement.

21. The combination with a part to be driven, and a motor for driving it through a cycle of movement, of a normally-open circuit for said motor, contacts for controlling said circuit, a key for closing said circuit through said contacts to start said motor, means for holding said circuit closed after the motor is started, a clutch between said motor and said driven part whereby the motor may run idly, said contacts being located outside of the clutch, means for causing said clutch to seize after said circuit is closed, means within said clutch for automatically releasing said clutch after one cycle of movement of said driven part and for thereafter holding said driven part locked until said key is depressed, and means for automatically breaking said circuit when said clutch is released.

22. The combination with a part to be driven through a cycle of movement, of a motor for driving said part, a normally-open circuit for said motor, contacts for controlling said circuit, a key for closing said circuit through said contacts, a clutch between said motor and said driven part, a stop moved by said key to permit said clutch to seize after said circuit is closed, a casing for said clutch, said contacts being located outside of said casing, a device within said casing to hold said circuit closed during one cycle of movement of said driven part, means extending beyond said casing for controlling said contacts from said holding device, and a connection from said clutch to said driven part whereby said stop normally locks said driven part.

23. The combination with a part to be intermittently driven, of a motor, a clutch between said motor and said driven part, a stop normally holding said clutch released and locking said intermittently driven part through said clutch, a key for moving said stop to cause said clutch to seize said intermittently driven part, and independent means controlled by said key for controlling the supply of power to said motor.

24. The combination with a part to be driven through a cycle of movement, of a motor for driving said part, a clutch between said motor and said driven part, a latch holding said clutch released and said driven part locked, an electric circuit for driving said motor, a switch clear of said clutch for controlling said circuit, and a single element for operating both said latch and said switch.

25. The combination with a motor, of an electric control therefor comprising a normally-open switch, a rotary element driven by said motor, an element arranged to bear upon the periphery of the rotary element, a rocker, actuating means therefor, a spring connecting said rocker and said switch to close the latter when the former is actuated, and a member associated with said rocker and engageable by the second-named element to hold said switch in closed position during such engagement, said rotary element having a depression therein for the reception of said second-named element, to open said switch.

26. The combination with a motor, of an electric control therefor comprising a normally-open switch, a rotary element driven by said motor, a pivotally-mounted element having one end thereof arranged to bear upon the periphery of the rotary element, a rocker, actuating means therefor, a spring connecting said rocker and said switch to close the latter when the former is actuated, and a member associated with said rocker and engageable by the other end of said pivotally-mounted element to hold said switch in closed position during such engagement, said rotary element having a depression into which the first-named end of said pivotally-mounted element is adapted to enter to release said member and permit said switch to open.

27. The combination with a motor, of an electric control therefor comprising a normally-open switch, a rotary element driven by said motor, a pivotally-mounted element having one end thereof arranged to bear upon the periphery of the rotary element, a rocker, actuating means therefor, a spring connecting said rocker and said switch to close the latter when the former is actuated, and a depending member connected to said rocker and provided with a tappet arranged to be engaged by the other end of said pivotally-mounted element to hold said switch in closed position during such engagement, said rotary element having a seat into which the first-named end of said pivotally-mounted element is adapted to enter to release said tappet and permit said switch to open.

28. The combination with a motor, a motor circuit, and a part to be driven by said motor, of a clutch between said driven part and said motor, a switch for closing said circuit, separate levers for controlling said clutch and said switch, and a key-actuated lever extending across both levers so as to engage and actuate the same when depressed, said key-actuated lever being arranged to act upon one of the first-named levers in advance of the other.

29. The combination with a motor, a motor circuit, and a part to be driven by said motor, of a clutch between said driven part and said motor, a switch for closing said circuit, separate levers for controlling said clutch and said switch, and a key-actuated lever extending across both levers so as to engage and actuate the same when depressed, said key-actuated lever being arranged to act upon the switch-controlling lever in advance of the clutch-controlling lever.

30. The combination with a motor, a motor circuit, and a part to be driven by said motor, of a clutch between said driven part and said motor, a casing inclosing said clutch, a switch exterior of said casing for closing said circuit, separate levers for controlling said clutch and said switch, and a key-actuated lever extending across both levers so as to engage and actuate the same when depressed, said key-actuated lever being arranged to act upon one of the first-named levers in advance of the other.

31. The combination with a motor, a motor circuit, and a part to be driven by said motor, of a clutch between said driven part and said motor, a casing inclosing said clutch, a switch exterior of said casing for closing said circuit, separate levers for controlling said clutch and said switch, and a key-actuated lever extending across both levers so as to engage and actuate the same when depressed, said key-actuated lever being arranged to act upon the switch-controlling lever in advance of the clutch-controlling lever.

32. The combination, with a part to be intermittently driven; of a motor; a motor circuit; a normally-open switch therein; a normally-open clutch between said motor and said driven part comprising a plurality of co-acting elements; closing means for said clutch and said switch; and means directly actuated by one element of said clutch for holding said switch closed during the revolution of said driven part.

33. The combination, with a part to be intermittently driven; of a motor; a motor circuit; a normally-open switch therein; a normally-open clutch between said motor and said driven part comprising a plurality of co-acting elements; closing means for said clutch and said switch arranged to effect the closing of the latter in advance of the former, so as to start the motor before the revolution of said driven part commences; and means directly actuated by one element of said clutch after the commencement of revolution for holding said switch closed until the termination of such revolution.

34. The combination, with a part to be intermittently driven; of a motor; a motor circuit; a normally-open switch therein; a normally-open clutch between said motor and said driven part comprising a plurality of co-acting elements; a clutch-closing device; a switch-closing device independent thereof; an operating member common to both devices and arranged to actuate the second-named device in advance of the first-named device, so as to start the motor before the revolution of said driven part commences; and means directly actuated by one element of said clutch after the commencement of revolution for holding said switch closed until the completion of such revolution.

35. The combination, with a part to be intermittently driven through a definite cycle of movement; of a motor; a motor circuit; a key; a lever moved thereby; an arm rocked by said lever during the movement of the latter in one direction, and arranged, when so rocked, to close said circuit; a latch normally holding said part against motion; a second arm shifted by said lever during its movement in said direction to release said latch and thereby permit said part to commence its cycle of movement; a cam on said part; and means associated with said cam for holding the first-named arm in rocked position during the remainder of the cycle and for releasing it at the termination thereof.

36. The combination, with a motor; of an electric control therefor, comprising a normally-open switch, a rotary cam driven by said motor, a pivotally mounted element having one end thereof arranged to bear upon the periphery of said cam, a member connected to close said switch, and a depending member connected to said switch-closing member, and provided with a tappet arranged to be engaged by the other end of said pivotally mounted element to hold said switch in closed position during such engagement, said cam arranged to release said tappet at one point in its rotation, so as to permit said switch to open.

37. The combination, with a part to be intermittently driven; of a motor; a motor circuit; a normally-open switch therein; a normally-open clutch between said motor and said driven part, said clutch comprising a cup and an element arranged to frictionally grip the same; closing means for said clutch and said switch; and means directly actuated by said clutch-cup for holding said switch closed during the revolution of said driven part.

38. The combination, with a part to be intermittently driven; of a motor; a motor circuit; a normally-open switch therein; a normally-open clutch between said motor and said driven part, said clutch comprising a cam and an element arranged to frictionally grip the same; closing means for said clutch and said switch; and means directly actuated by said cam for holding said switch closed during the revolution of said driven part.

39. The combination, with a part to be intermittently driven through a given cycle of movement; of a motor; a motor circuit; a normally-open switch therein; a normally-open clutch between said motor and said driven part, said clutch comprising a cup and an element arranged to frictionally grip the same; closing means for said clutch and said switch; and means directly actuated by said clutch-cup for holding said switch closed during said cycle of movement of said driven part, said cup having a depression therein for tripping said holding means to release the latter from said switch at the completion of said cycle of movement.

ALBERT W. T. BEYER.

Witnesses:
 DAVID G. SULLIVAN,
 THOS. GLEASON,
 CHARLES R. RAY,
 EDWARD P. STORY.